United States Patent [19]

Patel

[11] Patent Number: 4,788,432
[45] Date of Patent: Nov. 29, 1988

[54] RADIATION MONITORING DEVICE

[75] Inventor: Gordhanbhai Patel, Somerset, N.J.

[73] Assignee: JP Laboratories, Inc., Piscataway, N.J.

[21] Appl. No.: 74,592

[22] Filed: Jul. 17, 1987

[51] Int. Cl.⁴ .............................................. G01T 1/04
[52] U.S. Cl. ................................. 250/472.1; 250/474.1
[58] Field of Search ............................ 250/472.1, 474.1

[56] References Cited

U.S. PATENT DOCUMENTS

| | | | |
|---|---|---|---|
| 3,373,683 | 3/1968 | Alter | 250/472.1 |
| 3,855,477 | 12/1974 | Fleischer | 250/472.1 |
| 3,918,976 | 11/1975 | Arai et al. | 250/472.1 |

OTHER PUBLICATIONS

Fleischer et al., "Tracks of Charged Particles in High Polymers," *Science*, vol. 140, Jun. 1963, pp. 1221–1222.
Khan, "Semi-Automatic Scanning of Tracks in Plastics," *Radiation Effects*, vol. 8, No. 1 & 2 (1971), pp. 135–138.
Kuznetsov et al., "Use of Solid Track Detectors in Reactors Experiments" Sov. Atomic Energy (U.S.A.) vol. 32, No. 6, Jun. 1972, pp. 567–569.

*Primary Examiner*—Janice A. Howell
*Attorney, Agent, or Firm*—Omri M. Behr

[57] ABSTRACT

The present invention relates to a device for monitoring alpha particles and material emitting alpha particles such as radon and its daughters. The device can also be used for monitoring other high energy particles such as cosmic rays, nuclear fission fragments, nucleon ions, and neutrons having energy between 0.1 and 200 MeV.

In the operation of the invention, the high energy particles pass through and degrade tracks in a track registering material placed on a carrier substrate. These tracks are enlarged with a developing agent which etches the initial tracks. The enlarged tracks are then visualized by means of a color change in the immediate vicinity of these tracks.

40 Claims, 5 Drawing Sheets

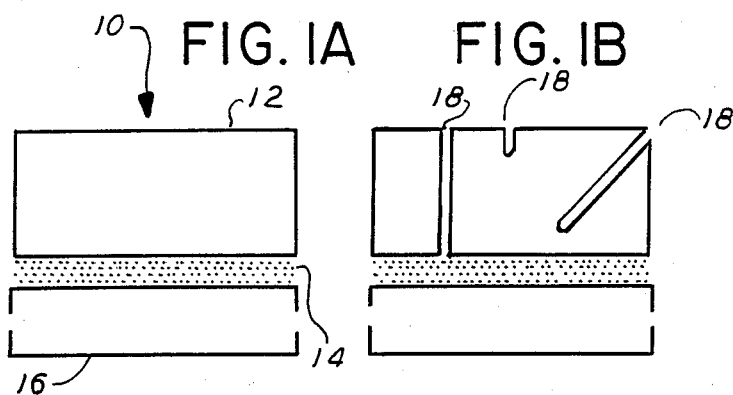

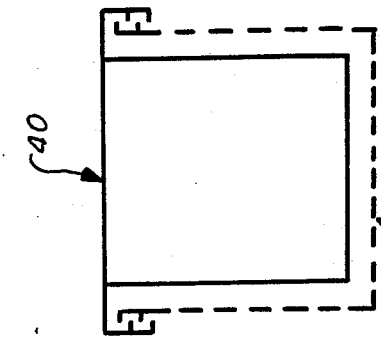
FIG. 3A
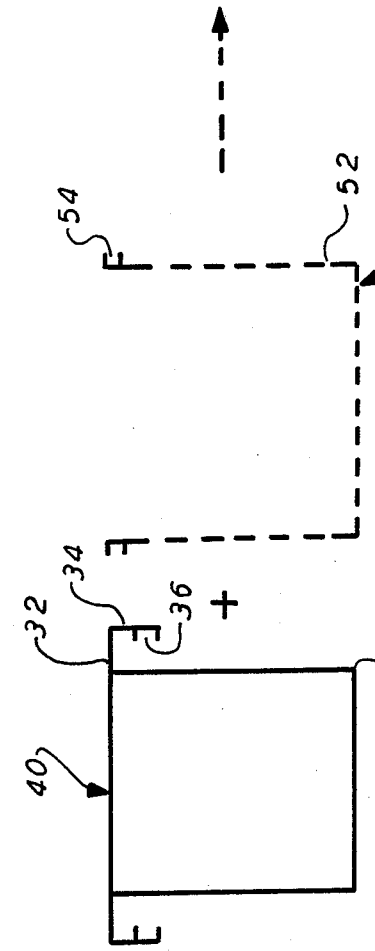
FIG. 3B
FIG. 3C
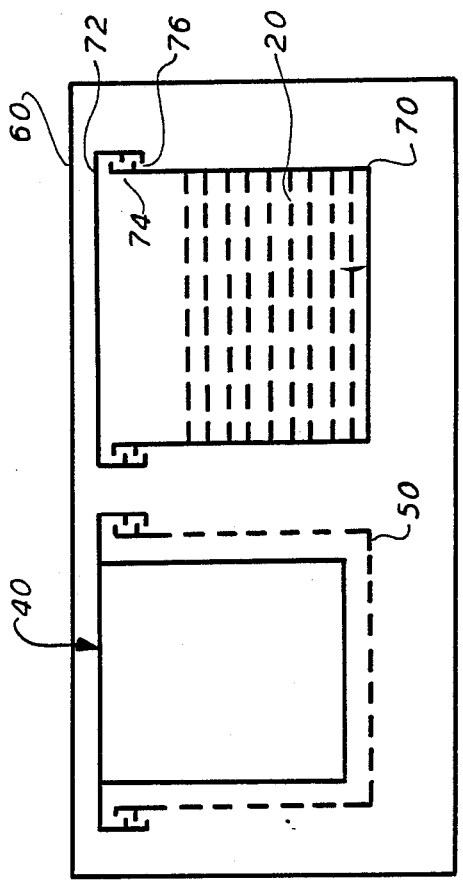
FIG. 3D
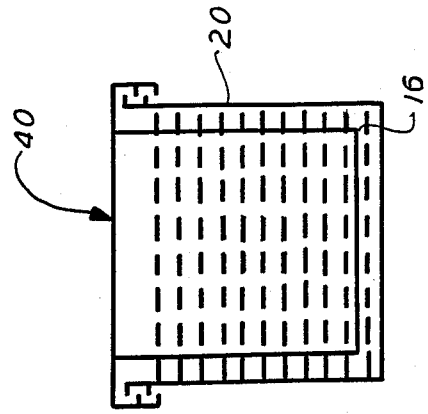
FIG. 3E

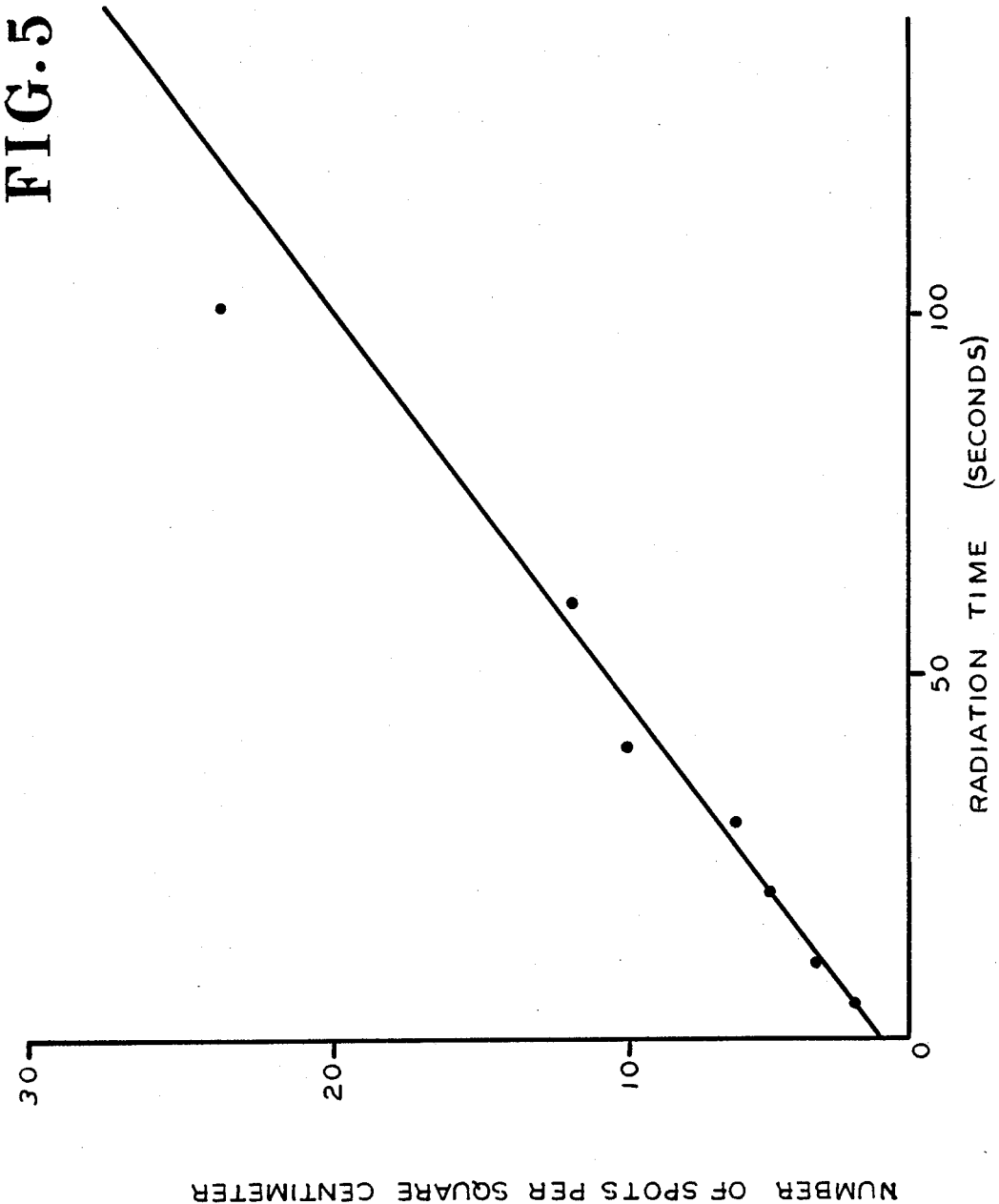

RADIATION MONITORING DEVICE

This invention was supported in part by grant #N43-CP-61074 from the U.S. Department of Health and Human Services, National Cancer Institute, Bethesda MD under the Small Business Innovation Research (SBIR) Program.

FIELD OF THE INVENTION

Monitoring of radiation, suitably of alpha particles.

BACKGROUND OF THE INVENTION

Radon is a naturally occurring radioactive noble gas produced by the decay of uranium-238 and radium-226, which are widely distributed in soil and rocks. Radon-222 decays by emission of alpha particles. Radon-222 undergoes four successive decays to radon daughters; polonium-218, lead-214, bismuth-214 and polonium-214. Polonium-214 undergoes further successive decays to Pb-210, Bi-210, Po-210 and ultimately to stable Pb-206.

The radioactive decay products of Ra-222 have a tendency to attach to ambient aerosol particles. Thus, radon and its daughters can enter the lungs with the air we breathe and lodge there. Two of the daughters, Po-214 and 218 decay rapidly, emitting high speed alpha particles (as does radon). If it occurs in the lungs, it can cause cell damage and lead to formation of cancerous cells. Radon concentration is usually expressed as picocuries per liter (pCi/l) or as working level (WL=200 pCi/l=$1.3 \; 10^5$ MeV of potential alpha energy). Radon in high concentration (i.e., above 0.1 pCi/l) has been found in houses of a number of countries of the world.

Radon can be detected by counting alpha particles in an ionization chamber (Geiger counters), it can also be detected with gamma ray counters by counting gamma rays emitted by its short lived daughters. Such equipment is expensive, bulky and highly sophisticated. Radon in houses is presently monitored by two devices, one is based on adsorption of radon on activated charcoal followed by monitoring gamma radiation emitted by its daughters and the other is based on the etching of latent tracks produced by alpha particles of radon and its daughters in certain plastics.

The activated carbon device requires the use of a highly sensitive, sophisticated, and expensive gamma ray counter. The etch track device requires very long exposure and requires professionally qualified services to provide etching and counting the etched tracks. Neither the charcoal nor the track etch device can be used and results analyzed by an average house owner. There is a need for device for monitoring low concentration of radon that can be used and interpreted by a nontechnical house owner without the need for any expensive equipment and any additional technical services.

Energetic charged particles, such as alpha particles, damage the material along their path. The damaged path, known as track (latent track), is a linear, highly localized region of altered physical and chemical structure compared to the bulk solid. The diameter of the latent tracks is 50–100 Angstroms (0.005 to 0.01 micron). The primary alpha particles from radioactive decay can penetrate approximately 30 microns (micrometer) in a solid or liquid material.

Certain inorganic nonconductors such as silicate minerals, alkali halides, insulating glasses, and organic polymers such as cellulose nitrate, cellulose acetate, cellulose acetatebutyrate, polymethylmethacrylate, poly (bisphenol-A carbonate), and a thermoset polymer of diallyl diethylene glycol carbonate (known as CR-39) are highly susceptible to high energy particles such as Cf-252 fission fragments, nucleon ions of elements, and alpha particles having energy of 0.1 Mev to 200 Mev. The materials that produce latent tracks when exposed to high energy particles are listed in Nuclear Tracks in Solids, Fleischer, Price and Walker, (University of California Press, Berkeley, CA, 1975) incorporated by reference herein. As the rate of diffusion and chemical attack on material in the latent track is substantially higher than the bulk material, the latent tracks can be etched. Particle track etching is a chemical process that preferentially removes the damaged areas and the material surrounding them. Typically, strong base solutions are used to etchants for polymeric materials. A list of alpha sensitive polymers, etchants and conditions to be used for etch development of tracks in polymers, glasses and mineral are also given in Fleishcher, Price, and Walker (supra).

SUMMARY OF THE INVENTION

There is provided a simple, low cost, user-friendly device for monitoring high energy particles or material emitting such particles which is self contained and does not require either expensive analytical equipment or technical service for analysis (or interpretation).

The device comprises a detecting element and a developing means therefore. The element of the device in its simplest form, comprises of a substrate in conjunction with a layer of indicator material, which undergoes color change when contacted with an etchant, over which is placed another layer of track registering material which produces latent tracks when struck by high energy particles. The element, after exposure to high energy particles, is then activated by immersion into a developing means comprising a developing agent including an etchant. The etchant removes the degraded or disordered material from the latent tracks and widens them, diffusess through the etched tracks (microscopic holes) and when it reaches the indicator it induces a color change therein making the location of track visible by appearance of a spot of different color. The spot will grow in size with the etching time due to the diffusion of the etchant through the indicator layer. Suitably the etchant is a solution of a water soluble developing agent in a hydroxylic solvent, said agent being selected from the group consisting of strong acids, strong bases, reducing agents and oxidizing agents.

A wide variety of materials can be used in the device. The substrate cold be glass, metal, or plastics which are not affected by the etching system or it can be another layer of the track registering material.

The indicating layer comprises either the indicator itself or a dispersant layer or both. The indicator may be, for example, a chemical pH dye such as aniline blue which undergoes color change when contacted by an etchant. The dispersant layer for the indicator, whose presence is not critical, may be a water sensitive, that is to say a water soluble, water permeable, water absorbing or water swellable layer, suitably a polymer through which the etchant can diffuse. The indicator may be in the form of a layer between the substrate and the track producing material. It may also be incorporated in the etchant system. If so the bond between the substrate and the track productivity should be weak for the etching system to diffuse along with the indicator. In such a sysatem the presence of a dispersant layer is desirable. The track registering material may be inorganic or organic, suitably polymeric and may be thermoplastic or thermosetting.

The developing means is suitably a container for the etchant. In one embodiment, the device is provided in a kit which comprises two chambers, suitably transparent vials in a container, suitably a box. A perforated vial contains the detecting element. The other vial contains the developing agent including the etchant.

The detecting element is suspended from the cap of the vial into the vial. The vial is removed from the box and exposed to tha atmosphere or suspected source of high energy particles for a predetermined period of time. After exposure, the cap containing the detecting element is removed from the perforated vial and placed onto the vial containing the etchant so that the element is immersed in the etchant for a predetermined time. The etchant will etch the latent tracks produced in the polymer and produce different color spots in the indicator layer under the tracks.

The total number of the spots on the detecting element are then counted. The total exposure/dose can be estimated from a calibration chart of total number of spots per unit area per unit time of exposure.

The actual structure of the device may have several embodiments. For example, the perforated vial could contain several elements. In such a case the elements can be removed at different times of exposure and activated to determine dose at different times.

BRIEF DESCRIPTION OF THE DRAWINGS

FIG. 1 is a crosssectional schematic representation of the structure and mode of operation of the detecting element specifically, FIG. 1a shows the device prior to irradiation.

FIG. 1b shows the detecting element having tracks made therein by irradiation.

FIG. 1c shows the element wherein the tracks of FIG. 1b are partially etched and the etchant has broken through into the detecting layer.

FIG. 1d shows the device upon further penetration of the etchant.

FIG. 2 shows two cross sectional views of two variations of the preferred embodiment of the detecting element specifically, FIG. 2a shows a substrate coated on either side with an indicator layer and a track producing film on either side thereof.

FIG. 2b shows a pair of track registering layers having a polymeric dispersion layer sandwiched therebetween.

FIG. 3 shows a schematic cross sectional representation of the components of the device, the exposure and development stages of the process specifically, FIG. 3a shows the detector device attached to a threaded cap.

FIG. 3b is a perforated jar.

FIG. 3c shows the detector of FIG. 3a inserted into the jar of FIG. 3c.

FIG. 3d is a field device showing the device of FIG. 3c and a development tank of etchant.

FIG. 3e shows the detector device of FIG. 3a inserted into the etchant tank of FIG. 3d.

FIG. 5 is a plot of spots observed against radiation time for a detecting element irradiated with Pu-235.

DESCRIPTION OF THE PREFERRED EMBODIMENTS

Figure 4A:
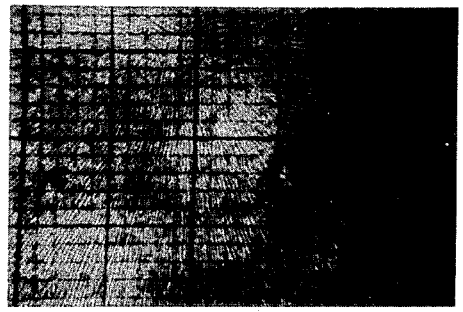
FIGS. 4(a thru f) shows the progress of the detecting element after development following exposure for different time periods.
Figure 4D:
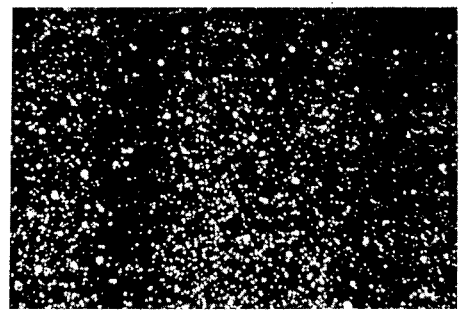
Figure 4B:
Figure 4E:
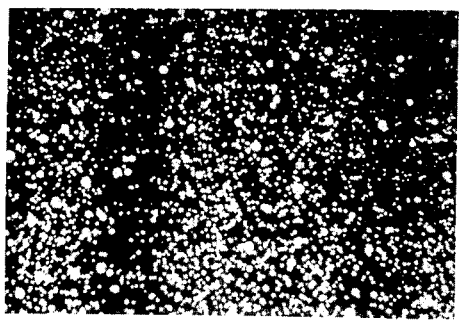
Figure 4C:
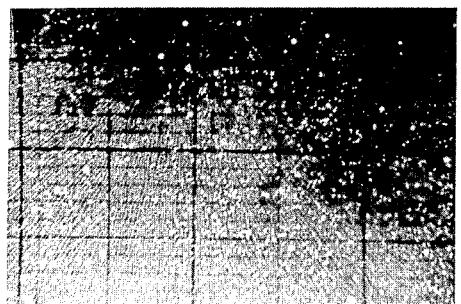
Figure 4F:
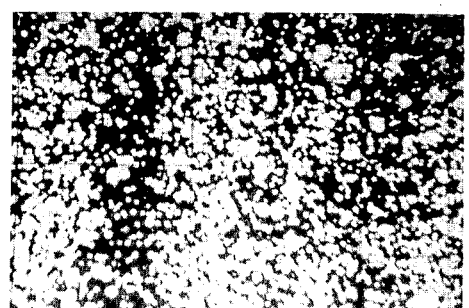

The detecting element 10 has three basic components, a substrate 16, an indicating layer 14 and, a track registering layer 12.

As substrate 16, there may be used any solid material which is not affected by the etchant system 20 and on which an indicator can be coated uniformly. Transparent or white (opaque or translucent) substrate is desirable so that the color spots can be seen. Materials such as glasses, metals, and plastics resistant to etchant can be used as the substrate. Alternatively, (as shown in FIG. 2b), a second layer of track registering material 12 may be used as substrate.

Any compound which undergoes a reasonably stable color change when reacted/contacted with the etching system can be used as an indicator. The selection of the indicating compound will depend upon the etchant. For example, if an alkaline or acid solution is used as an etchant, a pH sensitive dye which undergoes color change when contacted with alkali or acid respectively, is required. If the etchant is, itself colored, either self-colored such as potassium permanganate or colored with a dye, the etchant itself serves as an indicator. If the etchant is an oxidizing agent, a reduced dye such as leucomalachite green may be used.

The indicator layer may contain a dye per se, a dye in as dispersant layer or a dispersant layer per se. In the last case, the indicator (dye) could be in the etching solution. When the etchant breaks through the tracks and diffuses through indicator layer, the dye diffuses along with the etchant and develops color spots.

As etchants, there may be used:

aqueous sodium hypochlorite in the presence of sodium hydroxide, suitably 0.5% to saturated, preferably 2%, by weight of hypochlorite and 2 to 50%, preferably 30% by weight of hydroxide, aqueous potassium permanganate, 0.5 w/w% to saturated, suitably 5 w/w% in the presence of sodium hydroxide 1 to 50 w/w%, suitably 35 w/w% and potassium hydroxide 1 to 100 w/w%, suitably 36 w/w%, bichromate, suitably potassium bichromate 1% to 50% suitaby 5 w/w% in aqueous acid, suitably a mineral acid, for example, aqueous sulfuric acid 2 to 80 w/w%, suitably about 30 w/w%, aqueous alkali, suitably aqueous sodium hydroxide 1 w/w% to saturated preferably, suitably, but not critically, in the presence of a small amount (i.e., 0.1–1 w/w%) of a base compatible surfactant such as Benax (manufactured by Dow Chemical Corp., Midland, MI), and saturated aqueous potassium permanganate.

The required etching time is both concentration and temperature dependent as well as solvent dependent. Thus, for a 6 micron polycarbonate film at ambient temperature, the breakthrough time of methanolic KOH (water/methanol 1:1) was 45 min. at 6N and 14 hrs at 3N. The same amount at 6N required only 15 min. at 60° C. On the other hand, aqueous KOH at the same concentration (6N) requires 20 hrs. at ambient temperaure but only 3 hrs at 60° C.

As cosolvents may be utilized hydroxylic water miscible solvents such as: ethanol, methanol, glycol, acetic acid and citric acid.

The amount of cosolvent is also of influence, the aforesaid 45 min etch time of 6N KOH in water/MeOH 1:1, rises to 48 hours where the water/MeOH ratio is 9:1.

Further, breakthrough time is dependent on film thickness. Thus, for example, with a polycarbonate film activated with 6N aqueous KOH, breakthrough time after similar irradiation with will range from 20 hrs at ambient temperature at 6 microns to 300 hrs at ambient temperature at 20 microns.

Among the dyes that can be visualized by a basic etchant are:

Acid blue 92; acid red 1, acid red 88, acid red 151, alizarin yellow R, alizarin red 5, acid violet 7, azure A, brilliant yellow, brilliant green, brilliant blue G, bromocresol purple, bromothymol blue, cresol red, m-cresol purple, o-cresolphthalein complexone, o-cresolphthalein, curcumin, crystal violet, 1,5-diphenylcarbazide, ethyl red, ethyl violet, fast black K-salt, indigo carmine, malachite green base, malachite green hydrochloride, malachite green oxalate, methyl green, methyl violet (base), methylthymol blue, murexide, naphtholphthalein, neutral red, nile blue, alpha-naphthol-benzoin, pyrocatechol violet, 4-phenylazophenol, 1(2-pyridylazo)-2-naphthol, 4(2-pyridylazo) resorcinol Na-salt, alinizarin, quinalidine red, thymol blue, tetrabromophenol blue, thionin, xylenol orange.

Among the dyes that can be visualized by the acidic etchants are:

Acridine orange, bromocresol green-Na-salt, bromocresol purple Na-salt, bromophenol blue Na-salt, congo red, cresol red, chrysophenine, chlorophenol red, 2,6 dichloroindophenol Na-salt, eosin bluish, erythrosin B, malachite green base, malachite green hydrochloride, methyl violet base, murexide, metanil yellow, methyl orange, methyl red sodium salt, naphtho-chrome green, naphthol green base, phenol red, 4-phenylazo-aniline, rose bengal, resazurin, 2,2'4,4',4'' pentamethoxy triphenyl methanol or mixtures thereof.

Representative of common oxidants (oxidizing agents) are:

Ammonium persulfate, potassium permanganate, potassium dichromate, nitric acid, chlorine, bromine, iodine, Cerium (IV) sulfate, iron (III), chloride, potassium bromate, potassium iodate, sodium hypochlorite, hydrogen peroxide, manganese dioxide, sodium bismuthate, sodium peroxide, potassium chlorate and oxygen or mixtures thereof.

The following table provides some representative oxidation-reduction indicators and their color change.

| | Color change | |
|---|---|---|
| Indicator | Oxidized form | Reduced form |
| 5-Nitrol-1, 10-phenanthroline iron(II) sulphate (nitroferroin) | Pale blue | Red |
| 1,10-Phenthroline iron(II) sulphate (ferroin) | Pale blue | Red |
| 2,2'-Bipyridyl iron(II) sulphate | Faint blue | Red |
| 5,6-Dimethylferroin | Pale blue | Red |
| Diphenylaminesulphonic acid | Red-violet | Colorless |
| Diphenylbenzidine | Violet | Colorless |
| Diphenylamine | Violet | Colorless |
| 3,3'-Dimethylnaphthidine | Purplish-red | Colorless |
| Starch-KI | Blue | Colorless |
| Methylene blue | Blue | Colorless |
| Indophenols | Blue | Red |
| Nile Blue | Blue | Red |
| All leuco dyes | Colorless | Color |

Any insulating material which produces latent tracks when irradiated with high energy particles such as fission fragments, nucleon ions of elements, and alpha particles having energy of 0.1 to 200 MeV can be used as the track registering material in the device (see Fleischer, Price & Walker, supra, esp. p. 65–72). Inorganic materials can be coated by vacuum or spatter coating techniques. Though inorganic insulating materials can be used, organic polymers are preferred because they can be coated in form of thin film, either from their solution or melt. A mixture of track registering polymers may be used. The film should be thin enough for high energy particles to penetrate through. Thickness of the polymer coating required will depend upon the energy of the particle. For alpha particles of about 5 MeV energy, the thickness should be less than 30 microns, suitably 2 to 20 microns. For nuclear fission fragments and nucleon ions having higher energy, e.g. 100 MeV, the thickness could be greater than 30 microns, suitably 30–100 microns.

As track registering polymers, there may be used: Cellulose acetate (Kodacel, Triafol, Cellit); cellulose acetate butyrate; cellulose nitrate (Diacell, Nixon-Baldwin); cellulose triacetate (Kodaacel TA401, unplasticized, Bayer TN); ionomeric polyethylene (Surlyn), polycarbonate (Lexan, Makrofol, Merlon, Kimfol); polymethyl-methacrylate (plexiglass, Lucite); and polypropylene (cryovac), and CR-39. Polymers such as cellulose acetate, cellulose nitrate, poly(bisphenol-A carbonate) and CR-39 are especially preferred.

As dispersant layer, they may be used any water sensitive material soluble in, absorbs, is permeable by or swollen by water. These materials include paper, suitably filter paper and polymers such as: agar, agarose indubiose, carragheean, casein, cellulose microcrystalline, chitin, collagen, dextran, dextrin-white, gelatin, gum arabic, rubber-natural, zein, alginates, alkyl and hydroxyalkylalkylcellulose, carboxymethylcellulose, guar gum, gum agar, gum ghatti, gum karaya, gum tragsacanth, hydroxyethylcellulose, hydroxypropylcellulose, locust bean gum, pectins, polyacrylamide, poly (acrylic acid) and its homologs, polyethylene glycol, poly (ethylene oxide), polyvinyl alcohol, polyvinylpyrrolidone, starch and its modifications, tamarind gum and xanthan gum.

The system of the present invention can also be used for monitoring high energy particles such as neutrons which do not themselves produce latent tracks in the insulating materials but are capable of producing track producing particles such as alpha particles, proton or fission fragments when they interact with secondary materials such as boron-10, lithium-6, and uranium-235. For example, boron-10 when struck by a neutron particle, produces an alpha particle by a reaction known as the "(n, α) reaction". For monitoring such nontrack producing particles, the detecting element should either be in close contact with a thin film or layer of material capable of undergoing track producing particle reaction and have the radiator materials incorporated therein. These reactions and radiator materials which can be used for generating track producing particles are described by Fleischer, Price and Walker (supra).

A cross sectional view of the detecting element 10 of the device is shown schematically in FIG. 1a. A substrate 16 is coated with a very thin layer 14 of an indicator dispersed in a suitable medium having a thin (1 to 30 micron) upper layer of track registering material 12. The element 10 is exposed to high energy particles or material producing such particles. The particles, for example, alpha particles from radon and its daughters will produce latent tracks 18 in the track registering polymer 12, as shown schematically in FIG. 1b. After the exposure, the element is activated by placing it in etchant 20 as shown in FIG. 1c. The etchant 20 starts etching the latent tracks 118. When the etchant reaches the indicator, it changes its colors and it appears as a tiny spot 119 of color. With time, the tracks widen and more etchant diffuses through them and the spots grow in size. The etchant 20 diffuses through the indicator layer 14 in all directions and the spots 219 grow in size as shown schematically in FIG. 1d. Larger spots can be seen with the naked eyes and can be counted. If the concentration of the tracks is high, some of the spots would merge into one another.

Some high energy particles will not penetrate through the polymer and hence would produce partially penetrated latent tracks 18 as shown in FIG. 1b. The etchant will take longer time to etch and break through the partially penetrated tracks. Such tracks will appear as the new smaller dots 219 as shown in FIGS. 1c and 1d. Some partially penetrated tracks may not appear at all by the time the spots appeared earlier merge into one another. Penetration of high energy particles through the track producing material will depend upon the energy of the particle and the thickness of the track producing material. High energy fission fragments having energy of 100 MeV can penetrate substantially deeper than alpha particles having energy of 5 MeV.

Alternate embodiments are illustrated in FIG. 2. These are characterized by the use of two layers of track registering material.

Device 310, in FIG. 2a, the substrate 316 is suitably a transparent film, such as mylar and carries indicator layer 314 on either side. These layers are covered with registering layer 312. Since the film is transparent, the intensity of image is doubled.

A similar effect occurs in the FIG. 2b device 410 which comprises a dispersant, suitably polyvinylalcohol layer 415 containing the indicator sandwiched between track registering layers 412.

The indicator and track registering layer may be coated onto the substrate by methods well known in the art. A wide variety of coating equipment is readily available. Common coating methods are air knife, brush, calender, cast coating, curtain dip, extrusion, blade floating knife, gravure, kiss roll, off-set, reverse roll, rod, spray, and squeeze roll. These methods have been recently reviewed (K. J. Coeling, and T. J. Bublick, Encycl. Polym. Sci. Eng., Vol. 3, 552–615 (1986)). Most of the above methods can be used for a wide range of base materials, such as polyester, and coating compositions such as dyes dispersed/dissolved in a suitable medium and track registering polymers such as cellulose nitrate and polycarbonate.

Lamination is a process of uniting two or more layers of different materials into one, by action of heat or pressure. Like coating, there are a large number of lamination processes. Films of cellulose nitrate, CR-39 or polycarbonate can be laminated on to a dye coated substrate. The detecting element can also be prepared by coating the dye solution on the substrate followed by lamination of track producing polymer.

The field device is illustrated in FIG. 3 and comprises two jars, 50 and 70 in enclosed container 60. Jar 50, containing the detecting unit 10 and the other jar 70 containing the developing solution 20. Detecting unit 40 comprises element 10 mounted under cap 32 is mounted having a flange 34 with internal screw threads 36. The cap 32 is placed in a perforated (52) jar 50, having screw threads 54 which interact with threads 36 to form the detection device as shown in FIG. 3c. The purpose of enclosing the element 10 in jar 50 having holes 52 is to prevent finger prints during the handling while allowing the track registering material to become exposed to radon gas through holes. The developing jar 70 contains an appropriate amount of the developing solution 20 and is suitably a transparent plastic jar as shown on right hand side of FIG. 3d.

The detection unit 40 in jar 50 (FIG. 3c) is removed from the box 60 by the consumer and exposed to radon atmosphere, e.g. in the basement for a certain period of time. After the exposure, the unit 40 is removed from jar 50 which is discarded. Cap 32 carrying the detection element 10 is then placed on the development jar 70 as shown in FIG. 3e. As the threads 36 of the cap 40 match the threads 74 of jar 70, jar 70 can be closed tight. The developer 20 will etch the latent tracks 18 produced by the alpha particles. Once the spots appear and grow to a desired size (or after certain pre-determined time), the cap will be unscrewed and the element washed under water. Total number of the spots may be counted and concentration of radon can be determined from the chart of number of spots per device versus days of exposure or calibration curves. The chart or calibration curve can be included in the package along with the other literature on how to use the device.

In the field device described above, one can use any shaped substrate, e.g., solid cylinder or rectangle, coated with the dye and the track producing polymer. The consumer can be provided with an exposure jar containing more than one element for multi-exposure.

Although the invention has been described with regard to its preferred embodiments, it should be understood that changes and modifications obvious to one having the ordinary skill in his art may be made without departing from the scope of the invention, which is set forth in the claims which are appended thereto. Substitutions known in the art which do not significantly detract from its effectiveness may be employed in the invention.

EXPERIMENTAL

Example I

Preparation of Stock Solution of Cellulose Nitrate

To 24.3 g of the cellulose nitrate powder containing 30% ethyl alcohol 124.7 g of ethyl acetate, 4 g of isopropyl alcohol, 5 g of butyl alcohol, 8 g of cellusolve acetate (ethylene glycol monoethyl ether acetate), and 4 g dioctylphthalate were added sequentially. The mixture was mixed thoroughly until clear to provide a 10% cellulose nitrate solution. This stock solution may be diluted with ethyl acetate to obtain other diluted solutions. For example, in order to obtain 4% solution of cellulose nitrate, 40 g of the stock solution was diluted to 100 ml with ethyl acetate. This 4% solution was used for preparation of track producing polymer coating.

In accordance with the above procedure, in place of cellulose nitrate, there may be used cellulose acetate, cellulose acetatebutyrate, polymethylmethacrylate, and poly (bisphenol-A carbonate).

Example II

Preparation of Dye Solutions 0.5 g of aniline blue (water soluble) was dissolved in 100 ml of methanol with stirring. The resulting solution was filtered to remove suspended impurities.

In accordance with the above procedure, but in place of aniline blue, solutions of other dyes were also prepared, namely:

60 mg Brilliant Yellow+150 mg aniline blue in 50 ml methanol.
625 mg Brilliant Yellow+480 mg Brilliant green in 50 ml methanol.
100 mg bromophenol blue in 10 ml of methanol.
100 mg phenolphthalein in 10 ml of methanol.
100 mg thymolphthalein in 10 ml of methanol.
100 mg phenolphthelein+100 mg thymolphthalein in 20 ml methanol.

Example III

Preparation of Aniline Blue Solution Containing Cellulose Nitrate

To 100 ml of 0.5% stock solution of aniline blue of Example II, 10 ml of 4% cellulose nitrate in methanol was added.

Example IV

Preparation of Element by Spin Coating (a) A circular glass plate (30 cm diameter) was thoroughly cleaned. The cleaned glass plate was placed on turntable and spun at 78 revolutions per minute (rpm) at 30° C. in a clean room. 5 ml. of 0.5% solution of aniline blue in methanol of Example II was poured on the spinning glass plate. A uniform thin coating of aniline blue was obtained. After ten minutes, 10 ml of 4.0% solution of cellulose nitrate in ethyl acetate was poured on the dye coated glass plate which was still spinning at 78 rpm.

(b) In accordance with the above procedure, but in place of aniline blue in methanol, there is employed 5 ml. of 0.5% solution of aniline blue in methanol containing 0.4% cellulose nitrate prepared as in Example III.

Example V

Irradiation with Polonium 210 alpha source

Detection elements prepared in Example IV(b) were irradiated with alpha particles from polonium-210 (activity 500μ/Ci). The source was quickly moved over the element at a distance of about 0.5 cm. The irradiated elements were activated by treatment with 6M aqueous KOH solution at room temperature.

FIG. 4 comprises a series of photographs illustrating the appearance and growth of the spots. [A piece of inch-graph paper was placed behind the device while taking the photographs]. The color of the coating was blue and the spots were red. After about three hours tiny red spots started to appear. The spots grew into a millimeter size spots within a further hour. A small fraction of new spots continue to appear during the etching, probably, due to partially penetrating tracks.

In accordance with the above procedure and using detecting elements prepared as in Example IV(b) but coated with 1.8% solution (rather than a 4% solution) of cellulose nitrate were irradiated with alpha particles from polonium-210. The elements were activated with 6M aqueous KOH solution at room temperature. After about ten minutes tiny red spots similar to those shown in FIG. 4 started appearing and growing with time.

Example VI

Irradiation with Plutonium-235 alpha particles

The detecting elements described in Example IV(b) were irradiated with plutonium-235. Two sources with two different concentrations/intensities, 1 and 100 alpha particles per second per square centimeter were used. Plutonium-235 emits alpha particles of 5.1 MeV. After irradiation the devices were activated with 6M KOH and number of spots which appeared between 3 and 3.5 hour at room temperature were counted. FIG. 5 shows a plot of alpha spots observed (excluding spurious spots and tiny spots appearing later on) versus radiation time. Using a curve similar to that shown in FIG. 5, total flux of alpha particles can be estimated.

When the dose of the alpha particle was higher, above 100 second of irradiation, a picture of the source becomes visible. The results indicate that the element can be used to visualize radioactive (alpha emitting) materials.

Example VII

Exposure to Radon Gas

Detecting elements of Example IV(b) having coatings of aniline blue as the pH dye and cellulose nitrate as the alpha sensitive polymer, were exposed to radon gas. The concentrated of radon was 42 pCi per liter. The elements were exposed to radon for 2, 5, and 7 days. After the exposure the elements were activated with 6N KOH and red spots which appeared between 3 and 3.5 hour at room temperature were counted. Table 1 gives average number of spots per 25 square centimeter of element exposed to radon. Each element has 200 square centimeter area.

TABLE 1

Track-spots in Cellulose Nitrate Film Upon Exposure to Radon

| Sample # | Exposure Time (days) | Track Spots in 25 sq. cm. | Average Spots per 25 sq. cm. |
|---|---|---|---|
| L1 | 2 | 29 | 29 |
| L2 | 2 | 35 | |
| L4 | 2 | 25 | |
| L5 | 2 | 28 | |
| M1 | 5 | 60 | 64 |
| M2 | 5 | 67 | |
| M4 | 5 | 65 | |
| M5 | 5 | 62 | |
| H1 | 7 | 100 | 96 |
| H2 | 7 | 101 | |
| H4 | 7 | 93 | |
| H5 | 7 | 88 | |
| Cortrol-1 | 7 | 3 | |
| Cortrol-2 | 7 | 5 | |
| Cortrol-3 | 7 | 3 | 4 |

Note:
The concentration of radon was 42 pCi per liter.

Example VIII

Variation in Time Required for Appearance of the Spots

Detecting elements prepared according to procedure described in Example IV(b) were irradiated with alpha particles according to procedure described in Example V. The elements were activated with etching solution containing different concentrations of KOH, water, ethanol and glycerol. The time required for appearance of red spots were noted. The results are reported in Table 2. The results shown in this table indicate that the concentration of KOH can be substantially decreased and the time required for emergence of the color spots can be varied from 1 to 16 hours by adding nontoxic agents such as ethanol and glycerol.

TABLE 2

Variation time required for emergence of the spots for 20 micron cellulose nitrate coating.

| Solvent | Co-Solvent | KOH (molar) | Time (hour) |
| --- | --- | --- | --- |
| Water | — | 6.0 | 3.0 |
| Water | — | 2.0 | 4.0 |
| Water | Ethanol (6%) | 2.0 | 2.2 |
| Water | Ethanol (16%) | 2.0 | 1.1 |
| Water | Glycerol (66%) | 2.0 | 24 |

Example IX

Knife Coating

A polyester film 18"×12" was placed flat on a x-y recorder and was held in place by built-in suction of the recorder, a Bird-type wet film applicator of cut depth 0.0015 inch was placed against the arm of the recorder at one end of the polyester film. 5 g. of the dye (indicator) solution (0.05 g of aniline blue and 1.0 g of polyvinylalcohol in 4 ml of water) was poured in front of the applicator in a straight line. The arm of the recorder was then allowed to scan across the face of the polyester film causing the dye to form a thin uniform wet film of polyvinyl alcohol containing the dye. The solvent (water) was allowed to evaporate for a day to provide thin uniform coating. Cellulose nitrate was coated over the dye coating using the same techniques, that is, with about 10 g of 4% solution of cellulose nitrate prepared according to Example I, using the wet film applicator of 0.006 inch cut depth. The solvents were allowed to evaporate for an hour to get thin uniform coating of cellulose nitrate over the dye coating.

Using the procedure described above, elements having different thicknesses of the dye coating and that of cellulose nitrate, were prepared by using Bird type wet film applicators of different cut depths (0.0015 to 0.006 inch) and were used.

Using the procedure described above, elements were prepared using aniline blue dispersed in different media such as gum arabic, and mixtures of gum arabic and polyvinylalcohol.

Using the procedure described above, elements were prepared by using water soluble dyes, such as bromophenol blue, and cresol purple, dispersed in water soluble polymers such as polyvinyl alcohol and gum arabic.

Example X

Irradiation with Alpha Particles from Polonium-210

The elements prepared according to procedure described in example IX were irradiated with alpha particles from a radon daughter (polonium-210) and activated with 6N aqueous KOH according to the procedure described in Example V. Red colored spots similar to those shown in FIG. 4 appeared within 30 minutes at room temperature.

Example XI

Elements having Coatings on Both Sides of Substrate

An element, as shown in FIG. 2a, was prepared by coating aniline blue and cellulose nitrate according to the procedure described in Example IX. The element was then turned upside down, and the other side of the element was similarly coated. This provided an element having coating of aniline blue and cellulose nitrate on both the sides of the polyester sheet. The coatings of both the sides were irradiated with alpha particles from polonium source according to procedure described in Example X. The element was activated by dipping the element in a solution of 6N aqueous KOH. Red spots were observed on both the sides.

The objective of coating a transparent substrate on both sides was to demonstrate that the size of the final device can be reduced to half. In the field usable element both the sides will be exposed to radon atmosphere. When the device is activated, the spots will develop on both the sides. The coating is so thin that it would appear as if the coating and the spots are on one side only.

Example XI

Preparation of Elements by Lamination (FIG. 2b)

In order to demonstrate that commercially available lamination technique/equipment can also be used for preparation of the elements, some elements were prepared by lamination as described below.

A 8×12 inch piece of "KRAFT" type release tape paper coated with thin film of plastic followed by a coating of a silicone compound, obtained from Mactac Inc., Stow, Ohio and Tinicum Research Company, Frenchtown, NJ, was placed on a x-y recorder.

Cellulose nitrate was coated by placing about 5 g of 4% solution of cellulose nitrate prepared according to Example I, in front of the wet film applicator in a straight line. The arm of the recorder was then allowed to scan across the face of the release paper to form a thin uniform wet film of cellulose nitrate. The solvents were allowed to evaporate for an hour to get thin uniform coating of cellulose nitrate. 5 g of indicator solution (0.05 g of aniline blue and 1.0 g of polyvinylalcohol and gum arabic in 4 ml of water) were poured one side of the cellulose nitrate coating in front of the wet film applicator in a straight line. The arm of the recorder was then allowed to scan across the face of the coating causing the dye to form a thin uniform wet film of polyvinylalcohol containing the dye. The solvent (water) was allowed to evaporate for a day to get thin uniform coating of the dye on cellulose nitrate. A pressure sensitive adhesive tape was laminated over the dye coating. The assembly was turned upside down and the Kraft release tape was peeled off to provide the detecting element, that is, an adhesive tape having coating of aniline blue and cellulose nitrate. Because the KRAFT release film is coated with a special silicone releasing compound, it only adhered weakly to cellulose nitrate coating. Hence after lamination it was easier to peel off the release film.

The elements prepared by the above lamination technique were irradiated with alpha particles from polonium-210 and activated with 6N aqueous KOH solution. The laminated devices also showed colored spots similar to that shown in FIG. 4.

Example XII

Self-standing Element (FIG. 2b)

A 8×12 inch piece of Kraft release paper was placed on a x-y recorder and first coated with 10 g of 4% solution of cellulose nitrate using wet film applicator (0.006 inch cut depth). The coating was allowed to dry for a few hour. The Krfat release paper coated with cellulose nitrate was further coated with 8 gram of aniline blue solution (100 mg of aniline blue dissolved in 9.9 gram of 10% solution of polyvinylalcohol in water) using the wet film applicator (0.0015 inch cut depth). The coating was allowed to dry for a day. The Kraft release paper (coated with cellulose nitrate and aniline blue in polyvinylalcohol) was then further coated with 10 g of 4% solution of cellulose nitrate using wet film applicator (0.006 inch cut depth). The coating was allowed to dry for a few hours. The Kraft release paper was then carefully peeled-off from the coatings. The coatings were in the form of a film, that is, a film of polyvinylalcohol containing aniline blue sandwiched between two films of cellulose nitrate. Both the faces of this element were irradiated with alpha particles from polonium-210. The element was then activated by dipping in solution of 6N aqueous KOH. The time required for KOH to breakthrough and colored spots to appear was 60 min.

Example XIII

Need for Space for Diffusion of Etchant

A piece of Mylar film was coated with 5 g of a pressure sensitive adhesive (UR 1025, a synthetic latex supplied by United Resin Inc., Brooklyn, New York) containing 1% aniline blue using Bird type wet film applicator (0.006 inch cut depth). The solvent was allowed to evaporate for a day. Cellulose nitrate was coated on to the adhesive layer from 4% solution in ethylacetate using the wet film applicator. The resultant element was irradiated with alpha particles from polonium-210 and activated with 6N aqueous KOH. No red spots were observed even after two days. Absence of red spots indicates that layer under the alpha sensitive film does not allow KOH to diffuse through because water cannot diffuse through the adhesive layer containing the dye.

Example XIV

Need for Space for Diffusion of Etchant

A peice of a pressure sensitive adhesive tape (Macfilm of Mactac Corp., Stow, Ohio) was coated with 1:1 thymolphthalein-phenolphthalein from their 3% solution in methanol. A 6 micron film of poly(bisphenol-A carbonate) was laminated onto the dye coated adhesive tape. The resultant device was irradiated with alpha particles from polonium-210. The device was activated with 6N aqueous KOH. No red spots were observed even after two days at room temperature.

EXAMPLE XV

CR-39 as track producing polymer

CR-39 is a polymer of diallyl diglycol carbonate. Diallyl diglycol carbonate is a liquid at room temperature. Polymerization of diallyl diglycol carbonate is initiated with a radical initiator such as benzoyl peroxide or diisopropyl peroxydicarbonate. Benzoylperoxide requires longer time and higher temperature (above 100° C.) to cure. Diisopropyl peroxydicarbonate, referred to as IPP, is capable of polymerizing diallyl diglycol carbonate at low temperatures (20°-50° C.). However, IPP is very unstable (explosive) at room temperature.

Figure 6:
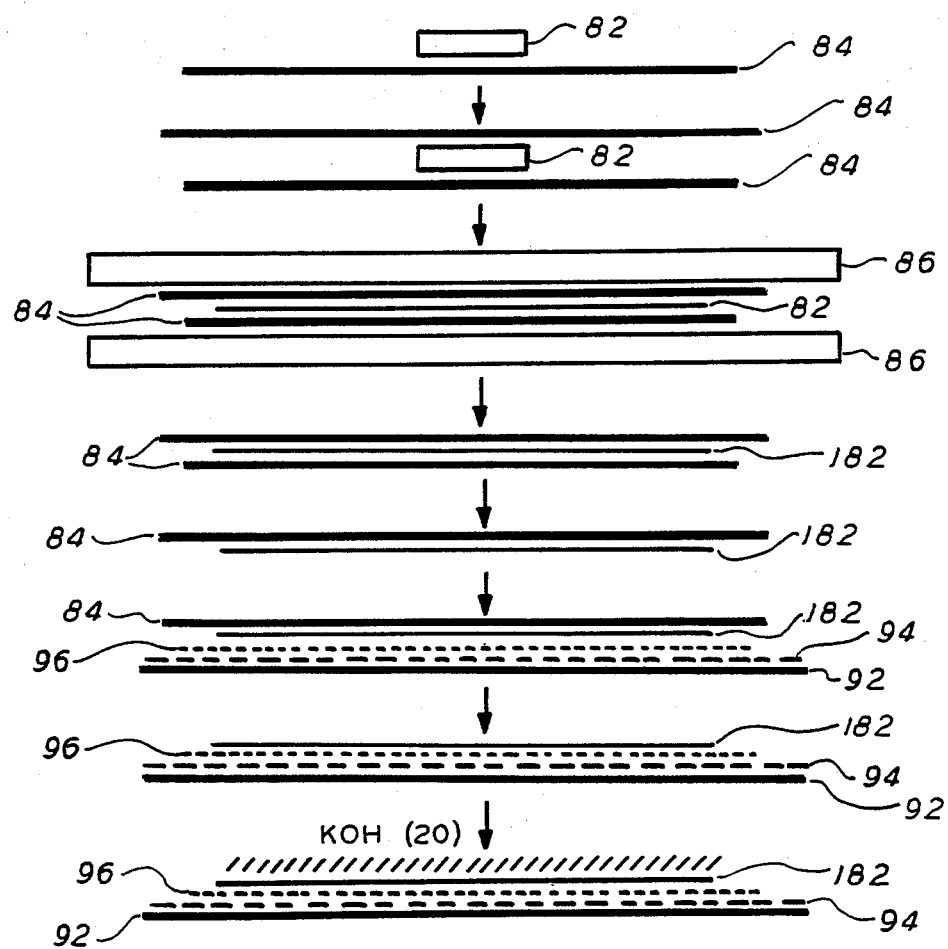
FIG. 6 is a crosssectional schematic representation of the construction and activation or mode of operation of a detecting element from a thermosetting monomer.

0.5 gram of the mixture (82) of diallyl diglycol carbonate containing 4% diisopropyl peroxydicarbonate was placed between two sheets of PET (84) (polyethylene terephthalate) (as shown schematically in FIG. 6). One of the PET sheets (8×11 inch) was larger than the other (7×10 inch). The sandwich was further sandwiched between two glass plates (86) (9×12 inch). The assembly was placed in an incubator at 60° C. and about 10 lb of weights were placed on the assembly. After 24 hours of curing, the glass plates were removed. The PET sheets were separated at one corner and one sheet was carefully peeled off. The film (182) of CR-39 (crosslinked diallyl diglycol carbonate) remained weakly adhered to one of the PET sheets. A wide tape (92) having a coating of a moist, water soluble gum (94), containing (or having layered thereon) aniline blue (96) was applied on to the film of CR-39 followed by careful peeling off of the PET sheet. This constitutes the detecting element. The whole process of preparing the element is shown schematically in FIG. 6.

The elements of CR-39 thus prepared were irradiated with alpha particles from polonium-210. Color spots and the impression of the source similar to those observed with cellulose nitrate in FIG. 4 were observed in six hours upon activation of the element with 6N aqueous KOH.

Example XVI

Preparation of element using polycarbonate film

A solution of phenolphthalein-thymolphthalein 1:1 in methanol was coated on a 6 micron polycarbonate [poly(bisphenol-A carbonate)] film. After drying, the opposite, the uncoated, surface of the polycarbonate film was exposed to Po-210 alpha source (activity of 500 μ/Ci) for different times ranging from a few seconds to a few hours. This film was then placed flat on a strip of filter paper on a glass plate with the dye coated face of the film in contact with the filter paper. 6N aqueous KOH was placed on top of the irradiated surface of the film and the time required for KOH to break through the tracks and for colored spots to appear was noted. The blue colored spots appeared after 20 hours at room temperature irrespective of irradiation time.

Using the procedure described above, but activating with 6N aqueous NaOH in place of KOH, the time required for the alkali to break through the tracks and spots to appear was 30 hours at ambient temperature.

Example XVII

Effect of Concentration of Etchant

Using the procedure described in Example XVI, elements were prepared using polycarbonate of 6 micron thickness. The elements were activated with 3N and 6N KOH in water:methanol (1:1). The time required for KOH to break through the tracks and spots to appear was noted. The time required for the spots to appear decreases with increase in concentration of KOH and methanol. The 6N and 3N methanolic KOH require 0.75 and 14 hours respectively at room temperature for the spots to appear.

Example XVIII

Effect of Temperature of Etching

Using the procedure described in Example XVI, elements were prepared using polycarbonate of 6 micron thickness. The elements were activated with 6N aqueous KOH and 6N methanolic (water:methanol, 1:1) at room temperature and at 60° C. The time required for KOH to break through the tracks and spots to appear was noted. The time required for the spots to appear decreases with increase in temperaure of etching, 6N aqueous KOH requires 20 and 3 hours at room temperature and 60° C. respectively while 6N methanolic KOH requires 45 and 15 minutes at ambient temperature and 60° C. respectively for the appearance of the spots.

Example XIV

Effect of concentration of co-solvent for KOH

The devices described in Example XVI were activated with different concentrations of KOH and additives. Aniline blue was used as the dye. The time required for KOH to breaktrhough and to induce color change from blue to red is shown in Table 3 below.

TABLE 3

| Conc KOH | Additives | Conc. Additives | Breakthrough Time |
|---|---|---|---|
| 6N KOH | MeOH | 50% | 45 min. |
| 6N KOH | MeOH | 30% | 2 hr |
| 6N KOH | MeOH | 10% | 48 hr |
| 3N KOH | MeOH | 50% | 24 hr. |

Example XX

Use of Different Dyes

Using the procedure described in Example XVI, elements were prepared using polycarbonate of 6 micron thickness and several other dyes. The elements were activated with 6N aqueous KOH. Different colored spots appeared after 6 hours at room temperature. The color change of the dyes when KOH broke through is listed in Table 4 below:

TABLE 4

| Dye | Dye coating | Color Spots |
|---|---|---|
| Bromophenol Blue | Yellow | Blue |
| Phenolphthalein | Colorless | Pink |
| Thymolphthalein | Colorless | Blue |
| Aniline Blue | Blue | Red |
| Brilliant Yellow + Aniline Blue | Green | Red |
| Brilliant Yellow + Brilliant Green | Green | Red |

Example XXI

Preparation of element using polycarbonate film of different thicknesses

Using the procedure described in Example XVI, elements were prepared using polycarbonate of 6 and 20 micron thickness. The elements were activated with 6N aqueous KOH. The time required for KOH to break through the tracks and spots to appear was noted. The time required for KOH to break through the tracks increases with increase in thickness of the film. 6 and 20 micron films required 20 hrs. and 300 hrs. at ambient temperature for emergence of spots.

Example XXII

Field Usable Devices (Kit)

A glass slide was coated with aniline blue by dipping in 0.5% solution of aniline blue in methanol. After drying the coating was coated with cellulose nitrate by dipping into 4.0% solution of cellulose nitrate in ethyl acetate. After exposure to alpha particles from polonium-210, the glass slide was placed in 6N aq. KOH solution at room temperature. The red colored spots developed in about 2 hours time and grew bigger till they merged in to each other.

Example XXIII

A film of 20% polyvinyl alcohol (100% hydrolyzed) was coated on a glass plate using a 0.003" Bird type applicator. This film was dried at room temperature for 2 days. A film of 4% cellulose nitrate solution was then coated on the above, using the same Bird type applicator. This was then dried at room temperature for 4 hours.

A portion of the above device was then exposed to as one source of alpha particles for 10 seconds. The exposed area was then covered with a dye solution comprising Aniline Blue in 6N aq. KOH. After 40 seconds, the dye solution was removed with a dropper, the exposed area very carefully wiped a with paper towel and a 5% HCl solution poured onto the exposed area. Within a few seconds, blue color appeared in the polyvinyl alcohol layer where the device had been exposed.

This indicates that it is not necessary to have a dye in indicator layer under the alpha sensitive film. The dye can be introduced along with the etchant to detect visualize particle penetration.

Example XXIV

A film of 4% cellulose nitrate solution was coated on a glass plate using a 0.003" Bird type applicator. This film was dried at room temperature for 4 hours.

A portion of the above device was then exposed to a strong source of alpha particles for 10 seconds. The exposed area was then covered with a dye solution comprising Aniline Blue in 6N aq. KOH. After 40 seconds, the dye solution was removed with a dropper, the exposed area very carefully wiped with a paper towel a 5% HCl solution poured on the exposed area. Within a few seconds, blue color appeared between the glass plate and the cellulose nitrate film where the device had been exposed.

This indicates that it is not necessary to have an indicator layer under the alpha sensitive film. The dye can be introduced along with the etchant to visualize alpha particle penetration.

While Examples XXII and XXXIV indicate that the device is operative without a dye in the indicator layer or indeed any indicator layer.

I claim:

1. A composite developable device for monitoring the presence of high energy radiation particles comprising:
   (a) at least one layer of track registering material capable of being penetrated by said particles to form tracks therein,
   (b) at least one indicator layer comprising a polymeric dispersion layer, having indicator dispersed therein, said indicator being capable of changing color in the presence of a solution of a water soluble developing agent in a hydroxylic solvent, said agent being selected from the group consisting of strong acids, strong bases, reducing agents and oxidizing agents, wherein one or more members of said group are also capable of etching the penetrated tracks in said track registering material, and (c) a carrier substrate wherein the indicator layer is coated on one side thereof on to said track registering material and on the other side thereof contacted by said carrier substrate.

2. A device of claim 1 for monitoring particles having an energy of between 0.1 and 200 Mev.

3. A device of claim 1 additionally comprising at least one radiator layer in contact with said track registering material, said radiator layer comprising material which when struck by high energy radiation particles will generate alpha particles.

4. A device of claim 1 additionally comprising at least one radiator layer in contact with said track registering material, said radiator layer comprising material which when struck by high energy radiation particles will generate fission fragments.

5. A device of claim 3 wherein the radiator layer material is selected from the group consisting of B-10 and Li-6.

6. A device of claim 4 wherein the radiator layer material is U-235.

7. A device of claim 1 wherein the carrier substrate is substantially resistant to said solutions of said developing agents.

8. A device of claim 1 wherein the carrier substrate is selected from the group consisting of glasses, ceramics, plastics and metals.

9. A device of claim 1 wherein the carrier substrate is a second layer of track registering material capable of being penetrated by said particles to form tracks therein.

10. A device of claim 1 wherein the carrier substrate is substantially planar and substantially translucent and is provided, on the side distal from the indicator layer with a second indicator layer itself in contact with a second layer of track registering material capable of being penetrated by said particles to form tracks therein.

11. A device of claim 1 wherein the particles are alpha particles.

12. A device of claim 1 wherein the particles are protons, nucleon ions, neutrons or fission fragments.

13. A device of claim 1 wherein the track registering material is inorganic.

14. A device of claim 1 wherein the track registering material is a polymer.

15. A device of claim 14 wherein the polymer is selected from the group consisting of cellulose nitrate, cellulose acetate, cellulose acetatebutyrate, polymethylmethacrylate, poly(bisphenol-A carbonate) and crosslinked poly (diallyl diethylene glycol carbonate) and mixtures thereof.

16. A device of claim 1 wherein the track registering layer is a polymeric film.

17. A device of claim 1 wherein the indicator layer is a dyestuff layer.

18. A device of claim 1 wherein the dispersant layer is a water soluble, water permeable, water absorbing or water swellable layer.

19. A device of claim 1 wherein the dispersant layer comprises a water soluble, water permeable, water absorbing or water swellable polymeric layer located between said track registering layer and said carrier substrate and having a dyestuff dispersed therein.

20. A device of claim 16 wherein the indicator, being a dyestuff, and the carrier substrate, are both selected to be insoluble in organic solvents in which said polymeric film material is soluble.

21. A device of claim 16 wherein the indicator, being a dyestuff, the dispersant layer, and the carrier substrate, are selected to be insoluble in organic solvents in which said polymeric film material is soluble.

22. A device of claim 1 wherein the indicator is at least one pH sensitive dyestuff.

23. A device of claim 1 wherein the indicator is at least one redox indicator dye.

24. A device of claim 1 wherein the developing agent is an alkali and the hydroxylic solvent is water, methanol or glycerol.

25. A device of claim 1 wherein the indicator is selected from the group consisting of Bromophenol Blue, Phenolphthalein, Thymolphthalein, Aniline Blue, Brilliant Yellow+Aniline Blue, Brillian Yellow+Brilliant Green.

26. A device of claim 25 wherein the indicator is aniline blue.

27. A method of monitoring the presence of high energy radiation particles which comprises the sequential steps of:

(a) exposing a device of claim 1 to an environment suspected of containing such particle radiation, for a predetermined period of time, (b) developing the latent image in said device by immersing said device in a hydroxylic solution of a developing agent of claim 1, (c) and washing the solution of developing agent from said device.

28. A method of claim 27 comprising the additional step of drying the washed device.

29. A method of claim 27 additionally comprising a water soluble, water absorbant, water permeable or water swellable dispersant layer located between said track registering layer and said carrier substrate and having said dyestuff dispersed therein.

30. A method of claim 27 wherein the track registering material is a polymeric film and, the indicator being a dyestuff and the carrier substrate, are selected to be insoluble in organic solvents in which said polymeric film material is soluble.

31. A method of claim 29 wherein the track registering material is a polymeric film and, the indicator being a dyestuff and the dispersant layer, and the carrier substrate are selected to be insoluble in organic solvents in which said polymeric film material is soluble.

32. A method of claim 27 wherein the track registering material is a polymer selected from the group consisting of cellulose nitrate, cellulose acetate, cellulose acetatebutyrate, polymethylmethacrylate, poly(bisphenol-A carbonate) and crosslinked poly(diallyl diethylene glycol carbonate) and mixtures thereof.

33. A method of claim 27 wherein the dyestuff is pH sensitive.

34. A method of claim 27 wherein the developing agent is aqueous alkali.

35. A method of claim 27 wherein the dyestuff is aniline blue.

36. A method of monitoring the presence of high energy radiation particles which comprises the sequential steps of:
(a) exposing a composite developable device to an environment suspected of containing such particle radiation, for a predetermined period of time, said device comprising:
  (i) at least one layer of track registering material capable of being penetrated by said particles to form tracks therein;
  (ii) a carrier substrate,
  (iii) an indicator layer coated on one side thereof on to said track registering material and on the other side thereof contacted by said carrier substrate, said indicator layer comprising a polymeric dispersion layer,
(b) developing the latent image in said device by immersing said device in a hydroxylic solution of a developing agent selected from the group consisting of strong acids, strong bases, reducing agents and oxidising agents, wherein one or more members of said group are also capable of etching the penetrated paths in said track registering material.

37. A method of claim 36 wherein the developing agent is aqueous alkali.

38. A method of claim 36 wherein the dyestuff is aniline blue.

39. A kit for the monitoring of high energy radiation particles comprising:
(a) a device of claim 1 packaged in an airtight readily openable container, and
(b) a developing chamber, in said container, of sufficient size to readily contain said device of claim 1, a sufficient amount of developing agent to provide a solution therein of predetermined concentration.

40. A kit for measuring the level of high energy radiation particles comprising:
a kit of claim 39 and a calibration chart.

* * * * *